(12) United States Patent
Lan et al.

(10) Patent No.: US 6,929,877 B2
(45) Date of Patent: Aug. 16, 2005

(54) BATTERY DEVICE

(76) Inventors: Hsin-Chang Lan, 13Fl., No. 7, Lane 6, Juangjing Rd., Shinyi Chiu, Taipei (TW), 110; Wei-Hsin Lan, 13Fl., No. 7, Lane 6, Juangjing Rd., Chinyi Chiu, Taipei (TW), 110

( * ) Notice: Subject to any disclaimer, the term of this patent is extended or adjusted under 35 U.S.C. 154(b) by 271 days.

(21) Appl. No.: 10/309,620

(22) Filed: Dec. 4, 2002

(65) Prior Publication Data

US 2004/0009395 A1 Jan. 15, 2004

(30) Foreign Application Priority Data

Jul. 9, 2002 (TW) ........................................ 91115198 A

(51) Int. Cl.[7] .......................... H01M 4/00; H01M 2/14; H01M 2/16
(52) U.S. Cl. .......................... 429/94; 429/129; 429/247
(58) Field of Search .......................... 429/94, 129, 130, 429/247

(56) References Cited

U.S. PATENT DOCUMENTS 5,368,961 A * 11/1994 Juergens ..................... 429/233
6,468,698 B1 * 10/2002 Hamano et al. ............ 429/316

* cited by examiner

*Primary Examiner*—Patrick Joseph Ryan
*Assistant Examiner*—Thomas H. Parsons
(74) *Attorney, Agent, or Firm*—Snell & Wilmer L.L.P.

(57) ABSTRACT

The present invention includes a bi-electrode structure including a substrate, a positive electrode, and a negative electrode. The positive electrode and the negative electrode are respectively formed on different sides of the substrate. The substrate is to support and insulate the positive electrode and the negative electrode. To improve the conductivity, the positive electrode has a first metal layer and a positive material layer Similarly, the negative electrode has a second metal layer and a negative material layer. After covering with a separator on either the positive electrode or the negative electrode, the bi-electrode structure is rolled to form a battery with cylindrical shape or stacked up to form a prismatic battery.

4 Claims, 5 Drawing Sheets

BATTERY DEVICE

This application claims priority of Taiwan Patent Application No. 091115198 filed on Jul. 09, 2002.

FIELD OF INVENTION

The present invention relates to an electrode plate structure of a battery.

BACKGROUND OF THE INVENTION

Recently, the trends for electronic equipment, such as mobile phones, digital cameras and personal digital assistant (PDA), etc. are toward thinner, lighter, and smaller equipment. The structure of a battery, which is used in much electronic equipment, then inevitably decides the weight, energy density, and volume of the battery.

The traditional electrode structure of a battery as shown in FIG. 2a and FIG. 2b includes a positive electrode 30, a separator 31, a negative electrode 32 and a separator 33 overlapping to form an electrode group. Then, at least one of the electrode group is rolled to form a circle, an ellipse or a spiral, as shown in FIG. 2a, within a cylindrical or prismatic case (not shown) for making a battery. Alternatively, a plurality of electrode groups are stacked, as shown in FIG. 2b, within a rectangular case (not shown) for making a battery. Then, an electrolyte is injected into the case to complete a battery.

The positive electrode 30 is usually made of a first metal plate and a positive material coated on both sides of the first metal plate. The negative electrode 32 is usually made of a second metal plate and a negative material layer coated on both sides of the second metal plate. The separators 31, 33 are porous and insulating to separate the positive electrode 30 from the negative electrode 32 so as to avoid forming a short circuit between the electrodes. On the other hand, the separators 31, 33 have many small apertures through which ions pass during the battery charging or discharging process.

The manufacture of a traditional battery is a mature technology. However, it is difficult to roll these overlapping plates during the manufacturing process of the battery. Besides, if each plate does not align with the other precisely, the desired overlapping areas are reduced. Accordingly, the capacity of the battery decreases. Moreover, it may even cause short circuit at the edges of these plates when the worst case happens. Due to the foregoing, there is a need for making high quality and cheaper batteries.

SUMMARY OF THE INVENTION

One aspect of an exemplary embodiment according to the present invention is to provide a bi-electrode structure of a battery. The bi-electrode structure includes a positive electrode and a negative electrode respectively combining with a substrate to simplify the manufacturing process of the battery.

The present invention provides a bi-electrode structure that includes a substrate, a positive electrode and a negative electrode. The positive electrode and the negative electrode are respectively formed on different sides of the substrate. To improve the conductivity, the positive electrode further includes a first metal layer formed on the substrate and a positive material layer formed on the first metal layer. Similarly, the negative electrode further includes a second metal layer formed on the other side of the substrate and a negative material layer formed on the second metal layer. The substrate is made of an insulating material to prevent the positive electrode and the negative electrode from short circuiting. A separator is disposed either on the positive electrode or the negative electrode to avoid short circuiting before the bi-electrode structure is rolled or stacked and placed in a case. Then, an electrolyte is injected into the case to make a battery.

This and other aspects of the present invention will become clear to those of ordinary skill in the art after having read the following detailed description of the preferred embodiment which is illustrated in the various figures and drawings.

DETAILED DESCRIPTION

Figure 1A:
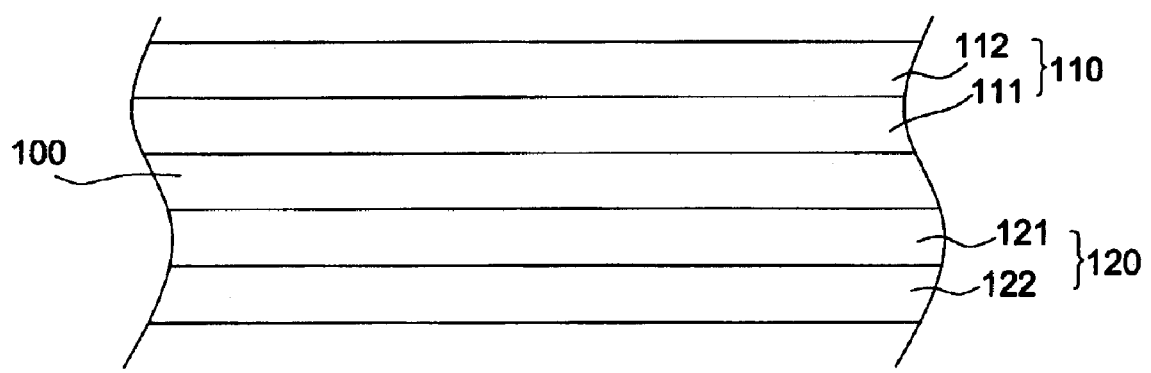
FIG. 1a is a cross-section view of bi-electrode structure according to an exemplary embodiment.

The present invention discloses a bi-electrode structure 10 for making a battery. FIG. 1a is a cross-section view of the bi-electrode structure 10 according to an exemplary embodiment. The bi-electrode structure 10 includes a substrate 100, a positive electrode 10 formed on one side of the substrate 100 and a negative electrode 120 formed on the other side of the substrate 100. The substrate 100 insulates the positive electrode 110 and the negative electrode 120 from short circuiting. In addition, the substrate 100 supports the positive electrode 110 and the negative electrode 120 to form a bi-electrode structure 10.

To improve the conductivity, the positive electrode 110 includes a first metal layer 111 and a positive material layer 112. The first metal layer 111 is formed on the substrate 100 and the positive material layer 112 is formed on the first metal layer 111. Similarly, the negative electrode 120 includes a second metal layer 121 and a negative material layer 122. The second metal layer 121 is formed on the other side of the substrate 100 and the negative material layer 122 is formed on the second metal layer 121, as shown in FIG. 1a.

The substrate 100 is made of an insulating material to prevent the positive electrode 110 and the negative electrode 120 from short circuiting. The first and the second metal layers 111, 121 are formed of a material selected from a group including but not limited to copper, aluminum and nickel. The method for forming the first and second metal layers 111, 121 on the substrate 100 utilizes the conventional technique, such as electroplating and sputtering. And, the method for forming the first and the second material layer 112, 122 respectively on the first and second metal layer 111, 121 includes rolling and pressing the materials on the first and second metal layers 111, 121.

Figure 1B:
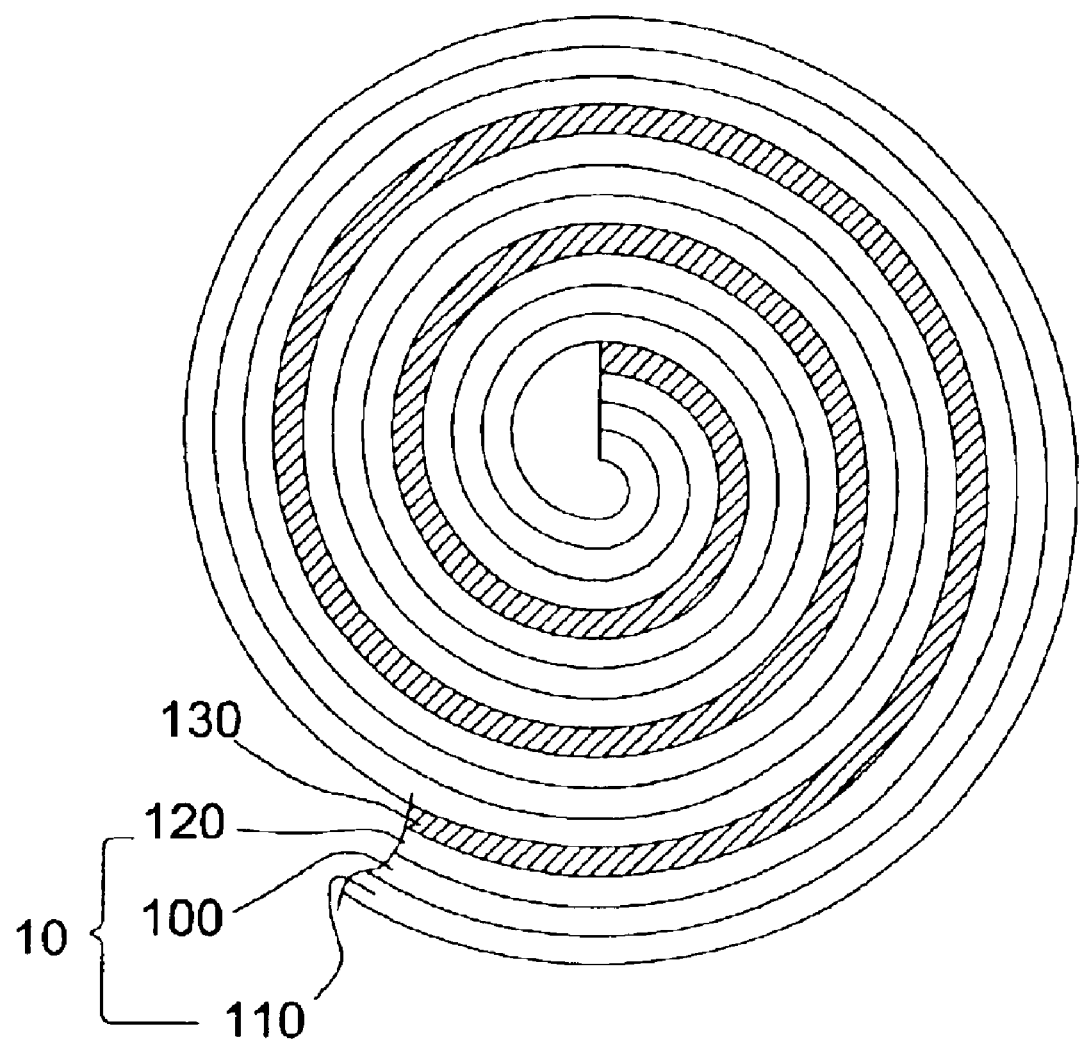
FIG. 1b is a schematic diagram of a rolling bi-electrode structure with a separator.
Figure 1C:
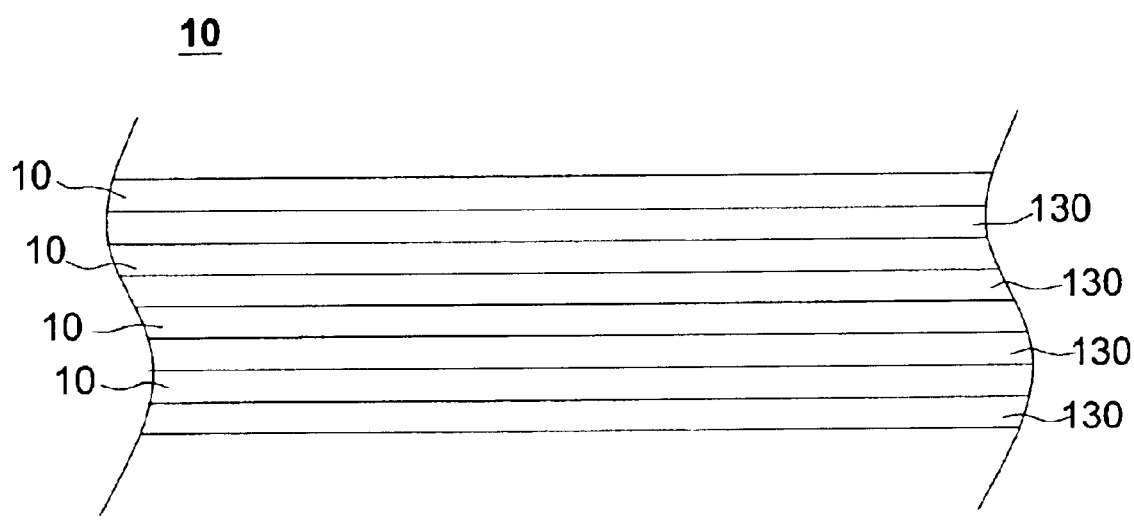
FIG. 1c is a cross-section view of a plurality of bi-electrode structures stacking with a plurality of separators according to an exemplary embodiment.
Figure 2A:
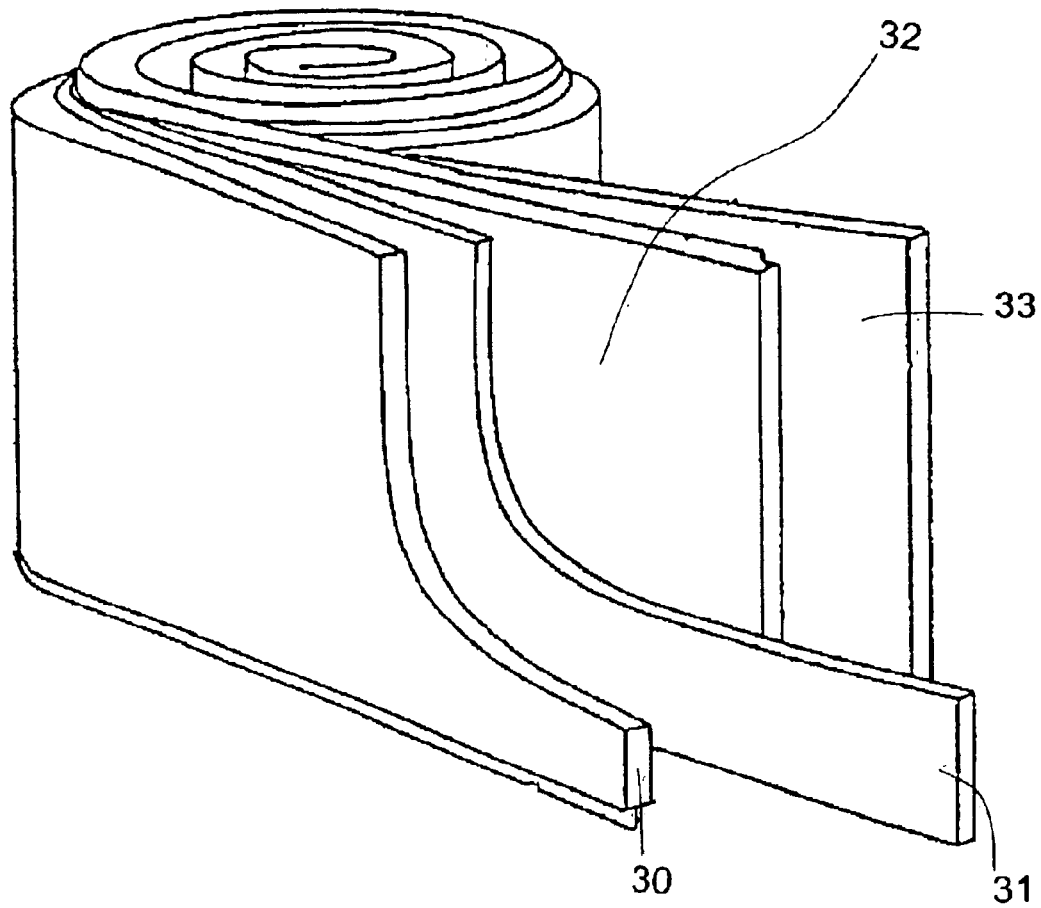
FIG. 2a is a schematic diagram of a rolling electrode group according to the conventional battery.
Figure 2B:
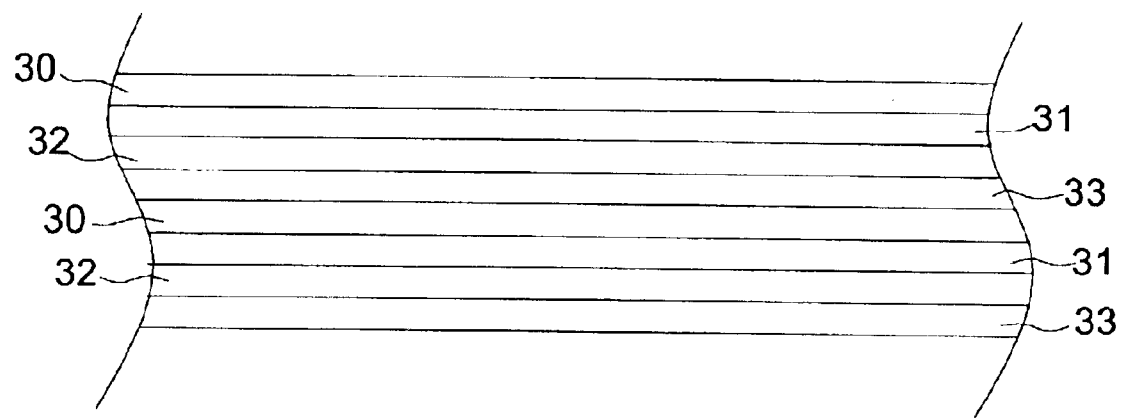
FIG. 2b is a cross-section view of an electrode group according to the conventional battery.

In addition, there is a separator 130 disposed either on the positive electrode 110 or the negative electrode 120 to form an electrode group (not shown). The separator 130 provides insulation and ion exchange paths between the positive electrode 110 and the negative electrode 120. The electrode groups can be rolled to form a cylindrical or prismatic battery, as shown in the FIG. 1b. Usually, at least one of the electrode groups is rolled to make a battery. On the other hand, referring to the FIG. 1c, a cross-section view of a stacking electrode structure is illustrated. The stacking electrode structure includes a plurality of the electrode groups. The method for forming the separator 130 on the bi-electrode structure 10 includes disposing the separator 130 on the bi-electrode structure 10 directly, sealing the separator 130 on the edge of the substrate 100, and sputtering a separated material on the surface of the bi-electrode structure 10.

Those skilled in the art will readily observer that numerous modifications and alterations of the device may be made within the teaching of the invention. Accordingly, the above disclosure should be construed as limited only by the metes and bounds of the appended claims.

What is claimed is:

1. A bi-electrode structure for a battery, comprising:
   a positive electrode;
   a negative electrode; and
   a substrate for insulating and supporting said positive electrode and said negative electrode;
   wherein, said positive electrode and said negative electrode are respectively formed on different sides of said substrate to form a single plate.

2. A bi-electrode structure for a battery, comprising:
   a positive electrode including a positive material layer and a first metal layer, said positive material layer being formed on said first metal layer;
   a negative electrode including a negative material layer and a second metal layer, said negative material layer being formed on said second metal layer; and
   a substrate for insulating and supporting said positive electrode and said negative electrode;
   wherein, said first and second metal layers are respectively formed on different sides of said substrate, and said positive and negative material layers are respectively formed on said first and second metal layers to form a single plate.

3. A battery, comprising:
   a bi-electrode structure according to claim 1; and
   a separator disposed selectively above at least one of said positive electrode and said negative electrode to form an electrode group, said separator providing insulation and ion exchange paths;
   wherein, at least one of said electrode group is rolled to form said battery or a plurality of said electrode groups are stacked to form said battery.

4. A battery, comprising:
   a bi-electrode structure according to claim 2; and
   a separator disposed selectively above at least one of said positive electrode and said negative electrode to form an electrode group, said separator providing insulation and ion exchange paths;
   wherein, at least one of said electrode group is rolled to form said battery or a plurality of said electrode groups are stacked to form said battery.

* * * * *